US009531243B2

United States Patent
Sakai et al.

(10) Patent No.: US 9,531,243 B2
(45) Date of Patent: Dec. 27, 2016

(54) MOTOR

(71) Applicant: Nidec Corporation, Kyoto (JP)

(72) Inventors: Teppei Sakai, Kyoto (JP); Takahiro Yama, Kyoto (JP); Kazushi Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 156 days.

(21) Appl. No.: 14/503,609

(22) Filed: Oct. 1, 2014

(65) Prior Publication Data
US 2015/0130332 A1    May 14, 2015

(30) Foreign Application Priority Data

Nov. 11, 2013   (JP) .................................. 2013-232781

(51) Int. Cl.
| | |
|---|---|
| *H02K 11/00* | (2016.01) |
| *H02K 5/16* | (2006.01) |
| *H02K 5/10* | (2006.01) |
| *H02K 5/22* | (2006.01) |
| *H02K 3/52* | (2006.01) |

(52) U.S. Cl.
CPC ............. *H02K 11/0073* (2013.01); *H02K 5/22* (2013.01); *H02K 11/33* (2016.01); *H02K 3/521* (2013.01); *H02K 5/225* (2013.01); *H02K 2203/03* (2013.01); *H02K 2211/03* (2013.01)

(58) Field of Classification Search
CPC .................................... H02K 5/00; H02K 5/24
USPC ... 310/67 R, 68 D, 90, 91, 156.12, 415, 418, 310/424, 425, 426, 427, 428
See application file for complete search history.

(56) References Cited

U.S. PATENT DOCUMENTS

| | | | | |
|---|---|---|---|---|
| 4,620,139 A | * | 10/1986 | Egami | ..................... H02K 29/08 310/62 |
| 6,278,248 B1 | | 8/2001 | Hong et al. | |
| 2003/0099561 A1 | * | 5/2003 | Heydt | ................. F04D 25/0613 417/423.1 |
| 2013/0171015 A1 | * | 7/2013 | Oguma | ................... F04D 25/06 417/423.7 |
| 2013/0234547 A1 | | 9/2013 | Oguma | |

FOREIGN PATENT DOCUMENTS

| | | |
|---|---|---|
| JP | 10-322973 A | 12/1998 |
| JP | 2005-102370 A | 4/2005 |
| JP | 2007-110791 A | 4/2007 |

\* cited by examiner

*Primary Examiner* — Jose Gonzalez Quinones
(74) *Attorney, Agent, or Firm* — Keating & Bennett, LLP (57) ABSTRACT

A motor includes an attachment portion, a first circuit board, and a second circuit board. The attachment portion is fixed to a frame of an apparatus to be driven by the motor. The first circuit board is located axially below coils and axially above the attachment portion. End portions of conducting wires defining the coils are connected to the first circuit board. The second circuit board is located axially below the attachment portion. An AC to DC conversion portion is mounted on the second circuit board. In addition, the attachment portion is arranged between the first and second circuit boards.

18 Claims, 6 Drawing Sheets

MOTOR

BACKGROUND OF THE INVENTION

1. Field of the Invention

The present invention relates to a motor.

2. Description of the Related Art

Household electrical appliances, such as, for example, hair dryers, are connected to household AC power supplies. Accordingly, AC motors have often been installed in the household electrical appliances. However, use of brushless DC motors in place of the AC motors makes it easier to provide high added value, such as fine rotation control. However, in order to drive the brushless DC motor by using the household AC power supply, an AC to DC converter arranged to convert an alternating current to a direct current is required. Accordingly, there is an increasing demand for brushless DC motors in which AC to DC converters are installed and which are designed for household electrical appliances.

A known motor including a converter circuit is described, for example, in JPH10-322973A.

Motors installed in household electrical appliances are often arranged in portions to be grasped by users, or in channels for gases. Therefore, a reduction in the outside diameter of the motor leads directly to a reduction in the size of the household electrical appliance. However, it is difficult to reduce the outside diameter of the motor in the case where a large number of electronic components including an AC to DC converter are to be mounted on a circuit board of the motor to expand functionality of the household electrical appliance.

SUMMARY OF THE INVENTION

Preferred embodiments of the present invention provide a structure for motors including a circuit board on which an AC to DC conversion portion is mounted and is configured to achieve a reduction in the radial dimension of the motor while also securing a large area in which electronic components are capable of being mounted on the circuit board.

A brushless DC motor according to a preferred embodiment of the present invention is configured to convert an alternating current to a direct current and to generate a torque with the resulting direct current, and includes a stationary portion fixed to a frame of an apparatus to be driven by the motor through a support member, and a rotating portion arranged to rotate about a central axis extending in a vertical direction relative to the stationary portion. The rotating portion includes a shaft arranged along the central axis, a rotor holder including a top plate portion arranged to extend around the shaft, and a cylindrical wall portion arranged to extend axially downward from an outer end portion of the top plate portion; and a magnet fixed to an inner circumferential surface of the wall portion directly or through a yoke. The stationary portion includes a bearing portion arranged to rotatably support the shaft, a housing including a cylindrical bearing holding portion arranged to hold the bearing portion, a plurality of coils arranged in a circumferential direction radially outside the housing and radially inside the magnet, an attachment portion fixed to each of the housing and the support member directly or through another member, and a circuit portion electrically connected to the coils. The circuit portion includes a plate-shaped first circuit board located axially below the coils and axially above the attachment portion, and to which end portions of conducting wires defining the coils are connected, a plate-shaped second circuit board located axially below the attachment portion, and arranged to include an AC to DC conversion portion mounted thereon, and an electrical connection portion configured to electrically connect the first and second circuit boards to each other. The first circuit board includes a through hole or a cut-out defined therein. The housing extends in the vertical direction through the through hole or the cut-out. The second circuit board includes a first region axially aligned with the first circuit board, a second region axially aligned with the through hole or the cut, and a third region which is not axially overlapping with any of the first circuit board, the through hole, or the cut-out. The support member is fixed to the third region.

According to the above preferred embodiment of the present invention, two circuit boards are arranged one above the other in an axial direction, and accordingly, a reduction in the radial dimension of the motor is achieved while a large area in which electronic components are capable of being mounted is secured. In addition, the attachment portion is arranged between the first circuit board and the second circuit board. This leads to an increase in an area in which electronic components are capable of being mounted on the second circuit board, and also leads to a reduction in the axial dimension of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which coils are arranged with respect to a circuit portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor according to any preferred embodiment of the present invention during manufacture and when in use.

Also note that the term "parallel" as used herein comprehends both parallel directions and substantially parallel directions. Also note that the term "perpendicular" as used herein comprehends both perpendicular directions and substantially perpendicular directions.

Figure 1:
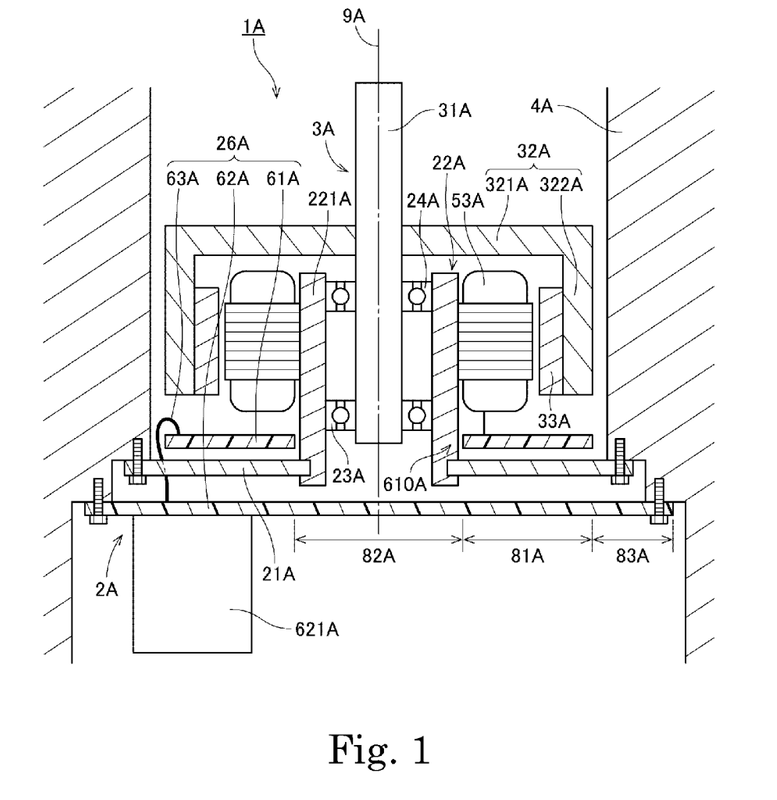
FIG. 1 is a vertical cross-sectional view of a motor according to a first preferred embodiment of the present invention.

FIG. 1 is a vertical cross-sectional view of a motor 1A according to a first preferred embodiment of the present invention. The motor 1A is preferably a brushless DC motor configured to convert an alternating current to a direct current and to generate a torque with the resulting direct current. Referring to FIG. 1, the motor 1A includes a stationary portion 2A and a rotating portion 3A configured to rotate about a central axis 9A. The stationary portion 2A is preferably fixed to a frame of an apparatus to be driven by the motor 1A through a support member 4A. The rotating portion 3A is arranged to rotate relative to the stationary portion 2A.

The rotating portion 3A preferably includes a shaft 31A, a rotor holder 32A, and a magnet 33A. The shaft 31A is arranged along the central axis 9A. The rotor holder 32A includes a top plate portion 321A and a wall portion 322A. The top plate portion 321A is arranged to extend in or substantially in the shape of a disk around the shaft 31A. The wall portion 322A is cylindrical or substantially cylindrical, and is arranged to extend axially downward from an outer end portion of the top plate portion 321A. The magnet 33A is held on an inner circumferential surface of the wall portion 322A directly or through a yoke.

The stationary portion 2A preferably includes an attachment portion 21A, a housing 22A, bearing portions 23A, and 24A, a plurality of coils 53A, and a circuit portion 26A. The attachment portion 21A is fixed to each of the housing 22A and the support member 4A either directly or through another member. The housing 22A preferably includes a cylindrical or substantially cylindrical bearing holding portion 221A. Each of the bearing portions 23A and 24A is held by the bearing holding portion 221A, and is arranged to rotatably support the shaft 31A. The coils 53A are arranged in a circumferential direction radially outside the housing 22A and radially inside the magnet 33A. The coils 53A are electrically connected to an electrical circuit mounted on the circuit portion 26A.

The circuit portion 26A includes a plate-shaped first circuit board 61A, a plate-shaped second circuit board 62A, and an electrical connection portion 63A. The first circuit board 61A is arranged axially below the coils 53A and axially above the attachment portion 21A. End portions of conducting wires defining the coils 53A are connected to the first circuit board 61A. The housing 22A is preferably arranged to extend in the vertical direction through a through hole 610A defined in the first circuit board 61A. The second circuit board 62A is arranged axially below the attachment portion 21A. An AC to DC conversion portion 621A is preferably mounted on the second circuit board 62A. The electrical connection portion 63A is arranged to electrically connect the first circuit board 61A and the second circuit board 62A to each other.

Referring to FIG. 1, the second circuit board 62A preferably includes a first region 81A, a second region 82A, and a third region 83A. The first region 81A is a region of the second circuit board 62A which is axially aligned with the first circuit board 61A. The second region 82A is a region of the second circuit board 62A which is axially aligned with the through hole 610A. The third region 83A is a region of the second circuit board 62A which does not axially overlap with either of the first circuit board 61A or the through hole 610A. The second circuit board 62A is fixed to the support member 4A at the third region 83A.

In the motor 1A, the first circuit board 61A and the second circuit board 62A are arranged one above the other in the axial direction. This contributes to reducing the radial dimension of the motor 1A while securing a large area in which electronic components are capable of being mounted. In addition, the attachment portion 21A is arranged between the first circuit board 61A and the second circuit board 62A. This eliminates a need to provide, in the second circuit board 62A, a hole or a cut-out through which the housing 22A is arranged to pass. This contributes to increasing an area in which electronic components are capable of being mounted on the second circuit board 62A. Moreover, a reduction in the axial dimension of the motor 1A is achieved compared to the case where the attachment portion 21A is arranged axially below the second circuit board 62A.

Figure 2:
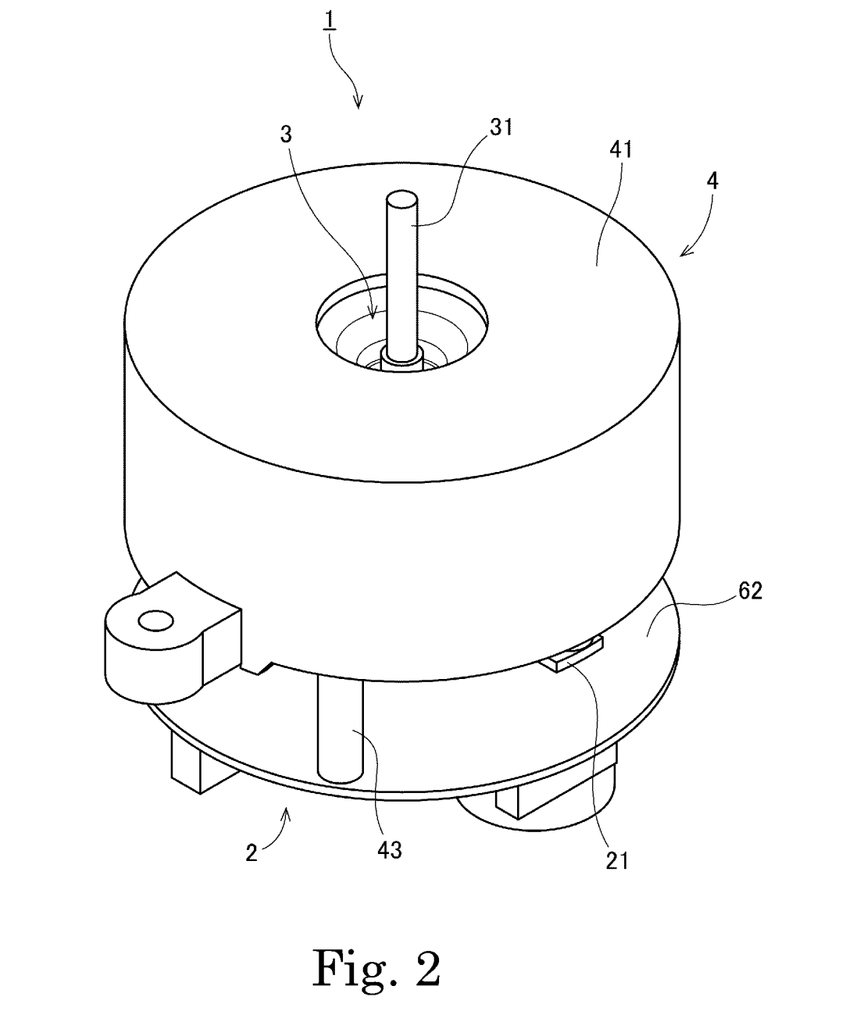
FIG. 2 is a perspective view of a motor according to a second preferred embodiment of the present invention.
Figure 3:
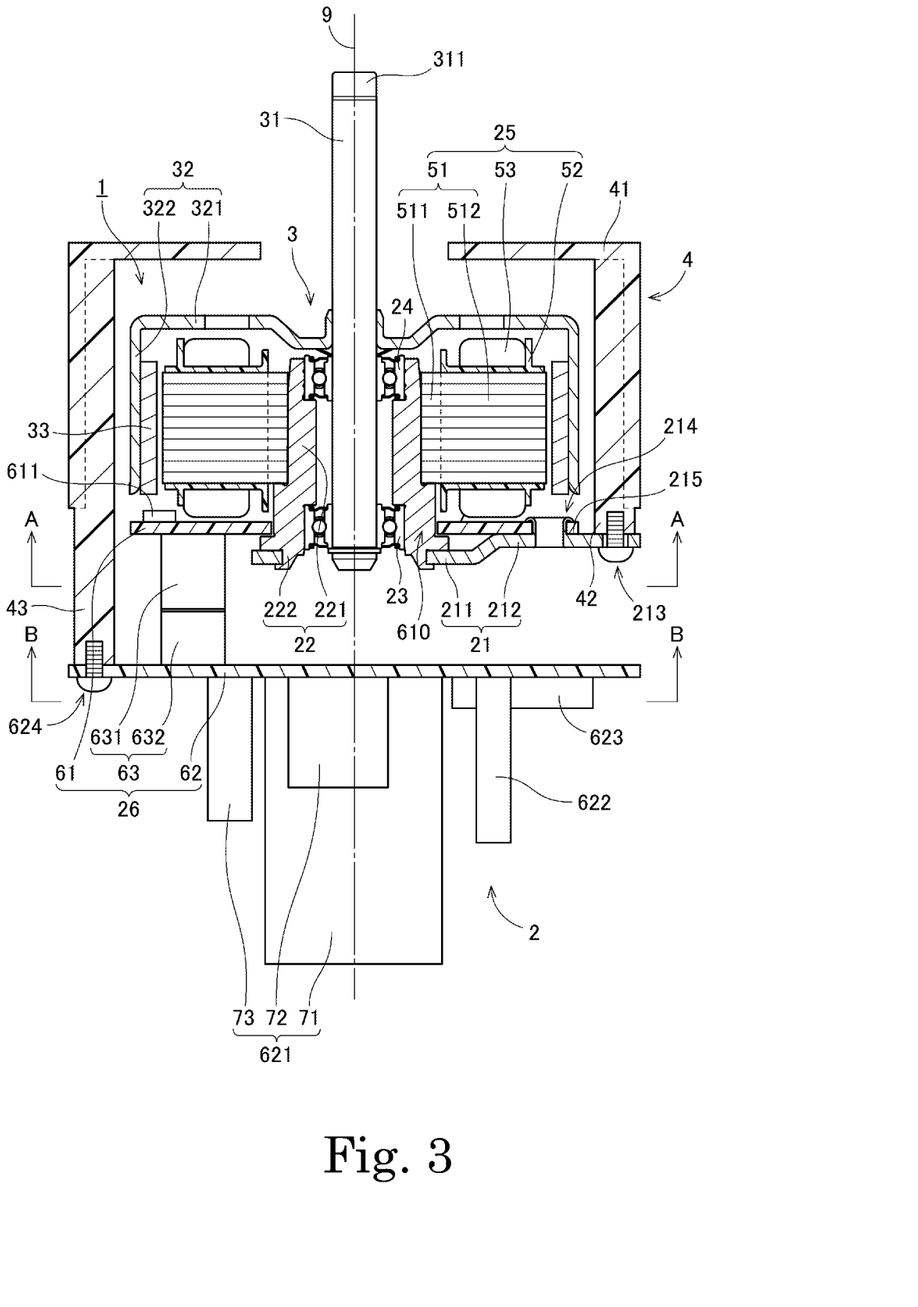
FIG. 3 is a vertical cross-sectional view of the motor according to the second preferred embodiment of the present invention.

Next, a second preferred embodiment of the present invention will be described below. FIG. 2 is a perspective view of a motor 1 according to the second preferred embodiment. FIG. 3 is a vertical cross-sectional view of the motor 1 according to the second preferred embodiment. The motor 1 is preferably a brushless DC motor arranged to convert an alternating current supplied from an outside to a direct current and generate a torque with the resulting direct current. The motor 1 is preferably used, for example, as a driving source of a household electrical appliance, such as, for example, a hair dryer or a hand blender for cooking use. Note, however, that motors according to preferred embodiments of the present invention may be installed in many types of apparatuses other than household electrical appliances, such as, for example, automobiles, personal computers, medical appliances, etc.

Referring to FIGS. 2 and 3, the motor 1 according to the present preferred embodiment includes a stationary portion 2 and a rotating portion 3. The stationary portion 2 is fixed to a frame of an apparatus to be driven by the motor 1 through a support member 4. The rotating portion 3 is supported such that the rotating portion 3 is rotatable relative to the stationary portion 2. The support member 4 preferably includes a cup portion 41 in or substantially in the shape of a covered cylinder, three first columnar portions 42, and three second columnar portions 43, for example. Each of the first and second columnar portions 42 and 43 is arranged to extend downward from the cup portion 41 to assume the shape of a column. Each second columnar portion 43 is preferably arranged to extend farther downward than each first columnar portion 42. The support member 4 may be either a portion of the motor 1 or a portion of the apparatus to be driven by the motor 1.

The stationary portion 2 according to the present preferred embodiment preferably includes a mounting plate 21, a housing 22, a lower bearing portion 23, an upper bearing portion 24, a stator 25, and a circuit portion 26.

Figure 4:
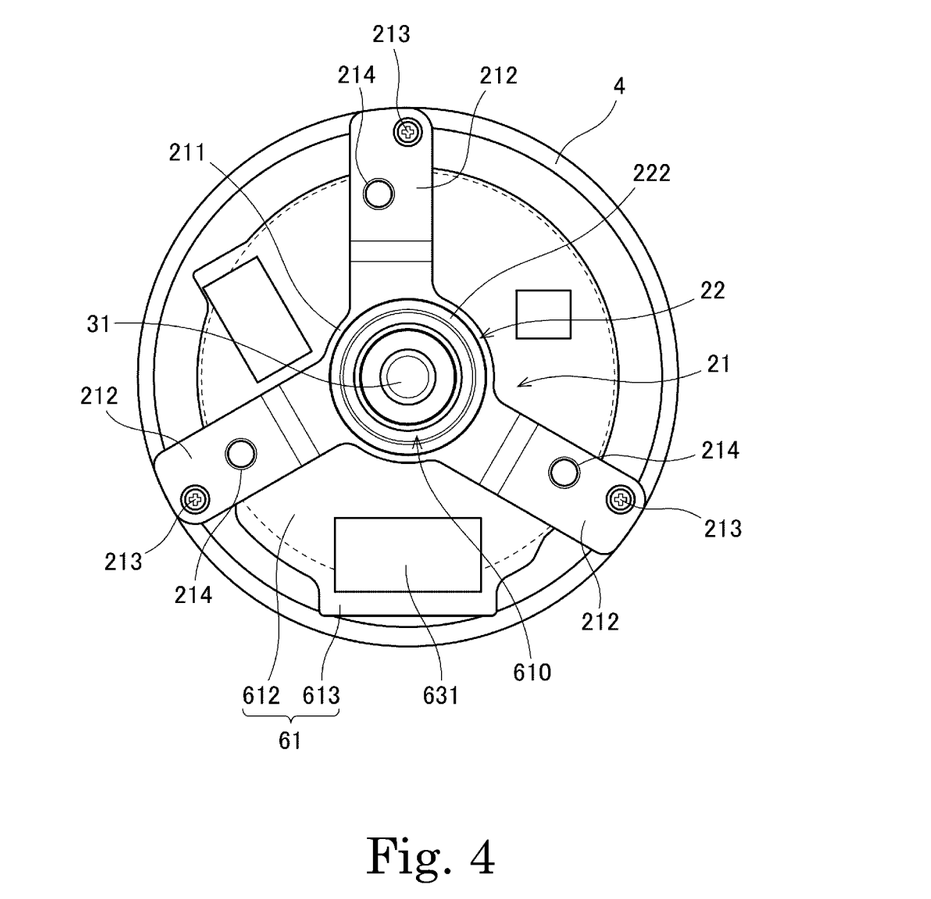
FIG. 4 is a plan view of the motor when viewed from a position indicated by line A-A shown in FIG. 3.

The mounting plate 21 is preferably a plate-shaped member made of metal and fixed to the support member 4. The mounting plate 21 is arranged to extend perpendicular to a central axis 9. The mounting plate 21 is an exemplary attachment portion according to a preferred embodiment of the present invention. FIG. 4 is a plan view of the motor 1 when viewed from a position indicated by line A-A shown in FIG. 3. Referring to FIGS. 3 and 4, the mounting plate 21 according to the present preferred embodiment preferably includes a central portion 211 and three arm portions 212.

The central portion 211 is an annular portion arranged around the central axis 9. Each of the three arm portions 212 is arranged to extend radially outward from the central portion 211.

Each arm portion 212 is fixed to a lower end portion of a separate one of the first columnar portions 42 in the vicinity of a radially outer end thereof. The arm portion 212 and the first columnar portion 42 may be fixed to each other through, for example, a screw. Note, however, that the arm portion 212 and the first columnar portion 42 may alternatively be fixed to each other through, for example, crimping or welding instead of the screw. In the present preferred embodiment illustrated in FIG. 3, the arm portion 212 and the first columnar portion 42 are preferably directly fixed to each other. Note, however, that another member may be arranged to intervene between the arm portion 212 and the first columnar portion 42.

The housing 22 is a member made of metal and supported by the mounting plate 21. The housing 22 according to the present preferred embodiment includes a bearing holding portion 221 and a crimping portion 222. The bearing holding portion 221 is arranged to extend in the axial direction around the central axis 9 to assume or substantially assume the shape of a cylinder. The crimping portion 222 is preferably arranged below the bearing holding portion 221. During manufacture of the motor 1, the crimping portion 222 is plastically deformed such that portions of the crimping portion 222 hold an inner circumferential edge of the central portion 211 of the mounting plate 21 from both sides in the vertical direction. The mounting plate 21 and the housing 22 are thereby fixed to each other. Note that the mounting plate 21 and the housing 22 may be fixed to each other through screws or welding instead of crimping. Also note that another member may be arranged to intervene between the mounting plate 21 and the housing 22.

Each of the lower bearing portion 23 and the upper bearing portion 24 is held on a radially inner side of the bearing holding portion 221. A ball bearing, which is arranged to cause outer and inner races to rotate relative to each other through balls, is preferably used as each of the lower bearing portion 23 and the upper bearing portion 24 according to the present preferred embodiment. The outer race of each of the lower and upper bearing portions 23 and 24 is fixed to an inner circumferential surface of the bearing holding portion 221. The inner race of each of the lower and upper bearing portions 23 and 24 is fixed to a shaft 31 included in the rotating portion 3. The shaft 31 is thus supported such that the shaft 31 is rotatable with respect to the housing 22. Note, however, that a bearing of another type, such as, for example, a plain bearing or a fluid bearing, may be used in place of the ball bearing.

The stator 25 preferably includes a stator core 51, an insulator 52, and a plurality of coils 53. The stator core 51 is arranged radially outside the housing 22 and radially inside a plurality of magnets 33, which will be described below. The stator core 51 is preferably defined by laminated steel sheets, that is, electromagnetic steel sheets placed one upon another in the axial direction, for example. The stator core 51 preferably includes an annular core back 511 and a plurality of teeth 512 arranged to project radially outward from the core back 511. An inner circumferential surface of the core back 511 is fixed to an outer circumferential surface of the bearing holding portion 221. The teeth 512 are arranged at regular or substantially regular intervals in the circumferential direction.

The insulator 52 is preferably a member made of, for example, a resin material and attached to the stator core 51. An upper surface, a lower surface, and both circumferential end surfaces of each of the teeth 512 are covered with the insulator 52. The coils 53 are arranged in the circumferential direction radially outside the housing 22 and radially inside the magnets 33. Each coil 53 is defined by a conducting wire wound around the insulator 52. In other words, according to the present preferred embodiment, the conducting wire is wound around each of the teeth 512, which serves as a magnetic core, with the insulator 52 intervening therebetween. The insulator 52 is arranged to intervene between the teeth 512 and the coils 53 to prevent an electrical short circuit from occurring between the teeth 512 and the coils 53.

Note that, if so desired, an insulating coating may alternatively be applied to a surface of each of the teeth 512 instead of using the insulator 52.

The circuit portion 26 is a unit configured to define an electrical circuit to supply a drive current to the coils 53. The circuit portion 26 preferably includes a first circuit board 61, a second circuit board 62, and an electrical connection portion 63. Each of the first circuit board 61 and the second circuit board 62 is a plate-shaped rigid board. Each of the first and second circuit boards 61 and 62 is arranged to extend perpendicular to the central axis 9. The first circuit board 61 is preferably positioned axially below the coils 53 and axially above the mounting plate 21. End portions of the conducting wires defining the coils 53 are electrically connected to the first circuit board 61 through, for example, soldering. The second circuit board 62 is arranged axially below the mounting plate 21. An AC to DC conversion portion 621 arranged to convert the alternating current supplied from the outside to the direct current is mounted on the second circuit board 62.

The first circuit board 61 and the second circuit board 62 are connected to each other through the electrical connection portion 63. The electrical connection portion 63 according to the present preferred embodiment preferably includes a pair of block-shaped connectors 631 and 632. Once the connectors 631 and 632 are joined to each other, terminals in the respective connectors 631 and 632 are brought into contact with each other. An electrical circuit on the first circuit board 61 and an electrical circuit on the second circuit board are thereby electrically connected to each other. Note, however, that the electrical connection portion 63 may be a lead wire, and that the electrical connection portion 63 may include both a connector and a lead wire.

The detailed structure of the circuit portion 26 will be described below.

The rotating portion 3 preferably includes the shaft 31, a rotor holder 32, and the plurality of magnets 33.

The shaft 31 is a columnar member arranged along the central axis 9. A metal, such as stainless steel, for example, is preferably used as a material of the shaft 31. The shaft 31 is configured to rotate about the central axis 9 while being supported by the lower bearing portion 23 and the upper bearing portion 24 described above. In addition, an upper end portion 311 of the shaft 31 is arranged axially above an upper surface of a top plate portion 321 of the rotor holder 32, which will be described below. A member which is to be driven by the motor 1, such as, for example, an impeller, is attached to the upper end portion 311 of the shaft 31.

The rotor holder 32 is preferably a member made of metal and fixed to the shaft 31. The rotor holder 32 is preferably obtained, for example, by subjecting a galvanized steel sheet, which is a magnetic body, to press working. The rotor holder 32 preferably includes the top plate portion 321 and a wall portion 322. The top plate portion 321 is arranged to extend perpendicular to the central axis 9 around the shaft 31. The shaft 31 is inserted into a circular hole defined in a center of the top plate portion 321. The wall portion 322 is arranged to extend axially downward from an outer end portion of the top plate portion 321 to substantially assume the shape of a cylinder.

The plurality of magnets 33 are held on an inner circumferential surface of the wall portion 322. A radially inner surface of each magnet 33 is a pole surface to be opposed to a radially outer end surface of each of the teeth 512. The magnets 33 are arranged in the circumferential direction such that north and south poles are alternately arranged. Each of the magnets 33 may be directly fixed to the inner circumferential surface of the wall portion 322 as illustrated in FIG. 3, or may alternatively be fixed to the inner circumferential surface of the wall portion 322 through a yoke preferably made of a magnetic material. Note that, in place of the magnets 33, a single annular magnet in which north and south poles are arranged alternately in the circumferential direction may alternatively be used.

Once the circuit portion 26 is connected to an external AC power supply, an alternating current supplied from the AC power supply is converted in the AC to DC conversion portion 621 on the second circuit board 62 to a direct current. Then, the resulting direct current flows through circuits mounted on the second circuit board 62 and the first circuit board 61, whereby the drive current is generated. Once the drive current is supplied to the coils 53, magnetic flux is generated around each of the teeth 512 of the stator core 51. Then, a circumferential torque is produced by interaction between the magnetic flux of the teeth 512 and that of the magnets 33, so that the rotating portion 3 is caused to rotate about the central axis 9.

Next, the preferred structure of the circuit portion 26 will be described in more detail below.

As described above, the circuit portion 26 includes the first circuit board 61 and the second circuit board 62. The first circuit board 61 and the second circuit board 62 are arranged one above the other with the mounting plate 21 arranged therebetween. Thus, in the motor 1, the two circuit boards 61 and 62 are arranged one above the other in the axial direction. This contributes to reducing the outside diameter of each of the first and second circuit boards 61 and 62 while also securing a large area in which electronic components are capable of being mounted. This in turn contributes to reducing the radial dimension of the motor 1.

An upper surface of the first circuit board 61 preferably includes land portions (not shown) where a copper foil is exposed. The conducting wires extending from the coils are soldered to the land portions. In addition, a Hall element 611, which is a magnetic sensor, is preferably mounted on the upper surface of the first circuit board 61. The Hall element 611 is arranged to detect the magnetic flux of the magnets 33 to detect a rotational position of the rotating portion 3 while the motor 1 is running. According to the present preferred embodiment, the Hall element 611 is arranged on the upper surface of the first circuit board 61, which is closer to the magnets 33 than is the second circuit board 62. This increases precision with which the rotational position of the rotating portion 3 is detected.

The AC to DC conversion portion 621, a transistor array 622, and a control IC 623 are preferably mounted on a lower surface of the second circuit board 62. The AC to DC conversion portion 621 includes an electrolytic capacitor 71, a rectifier 72, and an inductor 73. Each of these electronic components is greater in volume than any electronic component mounted on the first circuit board 61. According to the present preferred embodiment, such electronic components having large volumes are mounted on the lower surface of the second circuit board 62. This makes it possible to arrange the first circuit board 61 and the second circuit board 62 closer to each other. This in turn enables more effective use of a space around the circuit portion 26.

Referring to FIG. 4, the first circuit board 61 includes a body portion 612 which preferably is circular or substantially circular in a plan view, and a projecting portion 613 arranged to project radially outward from the body portion 612. In FIG. 4, the body portion 612 is a portion of the first circuit board 61 which is surrounded by a broken line. At least a portion of the connector 631 is arranged on the projecting portion 613. This reduces an area occupied by the connector 631 on the body portion 612. This in turn contributes to securing a larger space on the body portion 612 in which electronic components other than the connector 631 are capable of being arranged.

Each of the three arm portions 212 of the mounting plate 21 is preferably arranged to extend radially outward beyond an outer circumference of the body portion 612 of the first circuit board 61. Each arm portion 212 is fixed to a corresponding one of the first columnar portions 42 of the support member 4 at a position radially outward of the body portion 612. In other words, each of the three arm portions 212 preferably includes a first fixing portion 213 fixed to the corresponding first columnar portion 42 at a position radially outward of the body portion 612 of the first circuit board 61.

In addition, each arm portion 212 preferably includes a board fixing portion 214 at a position radially inward of the first fixing portion 213. During the manufacture of the motor 1, a portion of the arm portion 212 is preferably caused to rise in a cylindrical shape through so-called fluting, and an upper end portion thereof is caused to collapse to make contact with the upper surface of the first circuit board 61, such that the board fixing portion 214 is defined. The first circuit board 61 is fixed to the mounting plate 21 through the board fixing portions 214. Note, however, that another fixing method, such as, for example, welding, screwing, etc. may be used to fix the mounting plate 21 and the first circuit board 61 to each other.

In addition, each arm portion 212 preferably includes a board contact surface 215 arranged to be in contact with a lower surface of the first circuit board 61. The board fixing portion 214 includes at least a portion of the board contact surface 215. The board contact surface 215 is arranged at a level higher than that of an upper surface of the central portion 211. The first circuit board 61 is axially positioned by contacting the board contact surfaces 215. Moreover, the contact between the mounting plate 21 and the first circuit board 61 contributes to reducing the axial dimension of a combination of the mounting plate 21 and the first circuit board 61. This in turn contributes to reducing the axial dimension of the motor 1.

Furthermore, the contact between the first circuit board 61 and the mounting plate 21 contributes to reducing vibrations of the first circuit board 61. In particular, according to the present preferred embodiment, the board contact surfaces 215 are preferably arranged in upper surfaces of the arm portions 212 and not in the central portion 211 of the mounting plate 21, for example. Therefore, the first circuit board 61 is arranged to be in contact with each board contact surface 215 of the mounting plate 21 in the vicinity of a radially outer edge thereof. This contributes to more effectively reducing the vibrations of the first circuit board 61.

Referring to FIGS. 3 and 4, a circular or substantially circular through hole 610 is defined in a center of the body portion 612 of the first circuit board 61. The housing 22 is arranged to extend in the vertical direction through the through hole 610. Insertion of the housing 22 through the through hole 610 of the first circuit board 61 as described above makes it possible to arrange the first circuit board 61 at an axial level higher than that of a lower end portion of the housing 22, that is, makes it possible to arrange the first circuit board 61 closer to the magnets 33. This contributes to reducing the axial dimension of a combination of the first circuit board 61 and the housing 22. This in turn contributes to further reducing the axial dimension of the motor 1.

Figure 5:
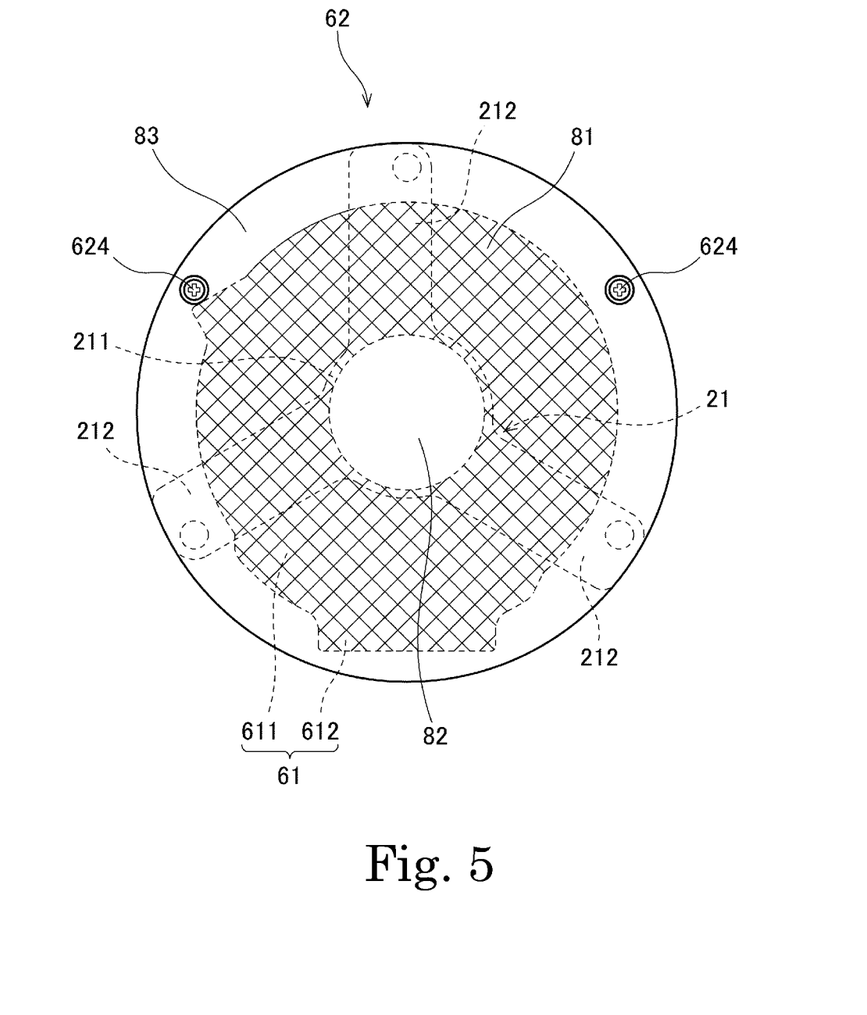
FIG. 5 is a plan view of the motor when viewed from a position indicated by line B-B shown in FIG. 3.

FIG. 5 is a plan view of the motor 1 when viewed from a position indicated by line B-B shown in FIG. 3. Note, however, that the electronic components mounted on the second circuit board 62 are not shown in FIG. 5. Referring to FIG. 5, the second circuit board 62 is arranged to be circular or substantially circular in the plan view. The second circuit board 62 is arranged to have an outside diameter greater than the outside diameter of the body portion 612 of the first circuit board 61.

The second circuit board 62 preferably includes a first region 81, a second region 82, and a third region 83. The first region 81 is a region of the second circuit board 62 which axially coincides with the first circuit board 61. In FIG. 5, the first region 81 is indicated by cross-hatching. The second region 82 is a region of the second circuit board 62 which axially coincides with the through hole 610 of the first circuit board 61. The third region 83 is a region of the second circuit board 62 which axially overlaps with neither the first circuit board 61 nor the through hole 610.

The second circuit board 62 is fixed to the second columnar portions 43 of the support member 4 at positions radially outward of the body portion 612 of the first circuit board 61. In particular, according to the present preferred embodiment, each second columnar portion 43 is preferably fixed to the third region 83 of the second circuit board 62. That is, the second circuit board 62 includes, in the third region 83, second fixing portions 624 each of which is fixed to a corresponding one of the second columnar portions 43. Thus, in the motor 1, a region which does not axially overlap with the first circuit board 61 is preferably used to fix the support member 4 and the second circuit board 62 to each other. This contributes to reducing the radial dimension of the circuit portion 26.

The second circuit board 62 and each second columnar portion 43 may preferably be fixed to each other through, for example, a screw. Note, however, that the second circuit board and each second columnar portion 43 may be fixed to each other through crimping, welding, etc. instead of the screw. In the present preferred embodiment illustrated in FIG. 3, the second circuit board 62 and each second columnar portion 43 are directly fixed to each other. Note, however, that another member may alternately be arranged to intervene between the second circuit board 62 and each second columnar portion 43.

In addition, the second circuit board 62 is fixed to the support member 4 at circumferential positions different from those of the arm portions 212 of the mounting plate 21. That is, the first fixing portions 213 of the mounting plate 21 and the second fixing portions 624 of the second circuit board 62 are arranged at different circumferential positions. This prevents the first fixing portions 213 and the second fixing portions 624 from limiting the radial positions of each other. This contributes to further reducing the radial dimension of the motor 1.

Each arm portion 212 is preferably fixed to the support member 4 at a position axially overlapping with the third region 83 of the second circuit board 62. In addition, referring to FIG. 3, the positions at which the mounting plate 21 is fixed to the support member 4 and the positions at which the second circuit board 62 are fixed to the support member 4 are arranged on the same circle in a plan view. This contributes to further reducing the radial dimension of the motor 1.

Moreover, in the motor 1, the mounting plate 21 is preferably arranged between the first circuit board 61 and the second circuit board 62. In addition, the mounting plate 21 and the housing 22 are fixed to each other between the first circuit board 61 and the second circuit board 62. Each of the lower end portion of the housing 22 and a lower end portion of the shaft is arranged axially above an upper surface of the second circuit board 62. This eliminates a need to define, in the first region 81 and the second region 82 of the second circuit board 62, a through hole or a cut-out through which the housing 22 and the shaft 31 are arranged to pass. This contributes to increasing an area in which the electronic components are capable of being mounted on the second circuit board 62. Moreover, a reduction in the axial dimension of the motor 1 is achieved compared to the case where the mounting plate 21 is arranged axially below the second circuit board 62.

Moreover, according to the present preferred embodiment, AC to DC conversion is performed on the second circuit board 62, which is the closer to the AC power supply of the two circuit boards 61 and 62. This makes it possible to use a general-purpose circuit board designed for DC input as the first circuit board 61. This leads to an additional reduction in a production cost of the motor 1.

Furthermore, the motor 1 is preferably a so-called outer-rotor motor, in which the magnets 33 are arranged radially outside the stator 25. When compared to an inner-rotor motor, the outer-rotor motor is able to easily achieve reductions in radial dimension and size and an increase in efficiency. However, in the case of the outer-rotor motor, the rotor holder 32 arranged to join the shaft 31 and the magnets 33 to each other is required, and therefore, the circuit portion 26 can be arranged only on one axial side of the magnets 33. That is, the outer-rotor motor has more severe restrictions on the arrangement of the circuit portion 26 than the inner-rotor motor. The motor 1 according to the present preferred embodiment is of an outer-rotor type, and is able to secure a large area on which the electronic components are capable of being mounted in the circuit portion 26 while achieving a reduction in the radial dimension of the motor 1.

While preferred embodiments of the present invention have been described above, it will be understood that the present invention is not limited to the above-described preferred embodiments and it is possible to make various modifications to the above-described preferred embodiments.

Figure 6:
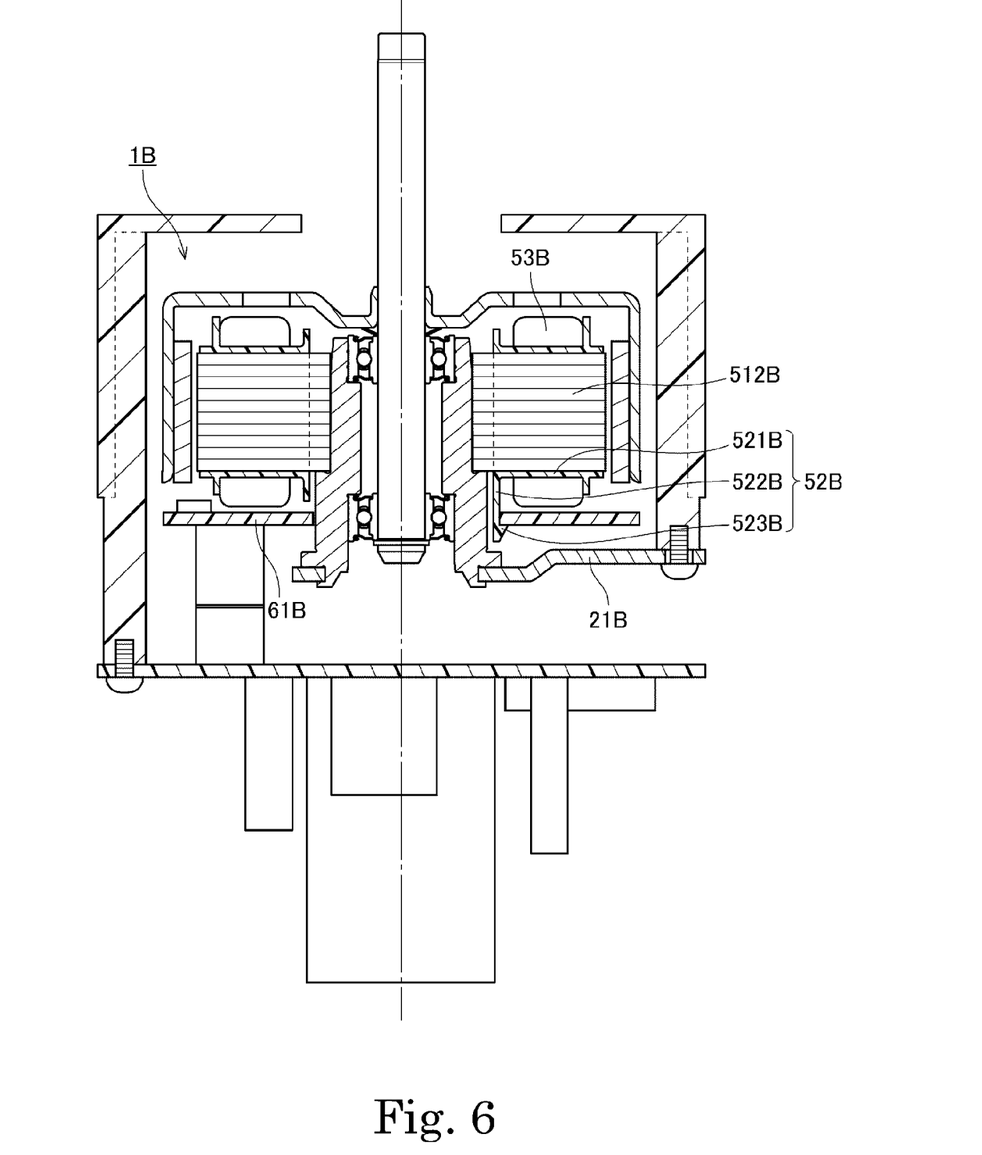
FIG. 6 is a vertical cross-sectional view of a motor according to an example modification of the second preferred embodiment of the present invention.

FIG. 6 is a vertical cross-sectional view of a motor 1B according to an example modification of the second preferred embodiment. According to the modification illustrated in FIG. 6, an insulator 52B preferably includes an insulating portion 521B, a leg portion 522B, and a claw portion 523B. The insulating portion 521B is arranged to intervene between teeth 512B and coils 53B. The leg portion 522B is arranged to extend axially downward from the insulating portion 521B. A lower end portion of the leg portion 522B is arranged axially below the coils 53B. The claw portion 523B is arranged to project radially outward from the lower end portion of the leg portion 522B. An upper surface of the claw portion 523B is preferably arranged to be in contact with a lower surface of a first circuit board 61B.

As described above, according to the modification illustrated in FIG. 6, the first circuit board 61B is supported not by a mounting plate 21B but by the claw portion 523B of the insulator 52B.

The above arrangements eliminate a need to provide, in the first circuit board 61B, a hole or a cut-out used to fix the first circuit board 61B to the mounting plate 21B. This contributes to increasing an area in which electronic components are capable of being mounted on the first circuit board 61B.

According to the second preferred embodiment described above, the support member 4 preferably is circular or substantially circular in a plan view. Note, however, that the shape of the support member 4 in the plan view may be rectangular or substantially rectangular, or other suitable shape. Also note that the shape of each of the first circuit board and the second circuit board may also be rectangular or substantially or other suitable shape. Also note that the circuit portion may include another circuit board in addition to the first and second circuit boards.

In each of the above-described first and second preferred embodiments, the through hole through which the housing is arranged to pass preferably is located in the center or the approximate center of the first circuit board. Note, however, that a cut-out through which the housing is arranged to pass may be defined in the first circuit board in place of the through hole. In this case, the third region of the second circuit board refers to a region of the second circuit board which axially overlaps with neither the first circuit board nor the cut-out. The cut-out may be in any shape as long as the cut-out is arranged to axially overlap with the housing. The shape of the first circuit board may become fan-shaped, substantially fan-shaped, semicircular, or substantially semicircular as a result of the cut-out being defined in the first circuit board.

Note that motors according to preferred embodiments of the present invention may differ in details of the structure from the motors according to the above-described preferred embodiments and the modifications thereof. Also note that features of the above-described preferred embodiments and the modifications thereof may be combined appropriately as long as no conflict arises.

Preferred embodiments of the present invention are applicable to a wide variety of motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A brushless DC motor configured to convert an alternating current to a direct current and to generate a torque with resulting direct current, the motor comprising:
   a stationary portion fixed to a frame of an apparatus to be driven by the motor through a support member; and
   a rotating portion configured to rotate about a central axis extending in a vertical direction relative to the stationary portion; wherein
   the rotating portion includes:
      a shaft extending along the central axis;
      a rotor holder including a top plate portion extending around the shaft, and a cylindrical wall portion extending axially downward from an outer end portion of the top plate portion; and
      a magnet fixed to an inner circumferential surface of the wall portion directly or through a yoke;
   the stationary portion includes:
      a bearing portion configured to rotatably support the shaft;
      a housing including a cylindrical bearing holding portion configured to hold the bearing portion;
      a plurality of coils arranged in a circumferential direction radially outside the housing and radially inside the magnet;
      an attachment portion fixed to each of the housing and the support member either directly or indirectly through another member; and
      a circuit portion electrically connected to the coils;
   the circuit portion includes:
      a plate-shaped first circuit board located axially below the coils and axially above the attachment portion, and to which end portions of conducting wires defining the coils are connected;
      a plate-shaped second circuit board located axially below the attachment portion, and arranged to have an AC to DC conversion portion mounted thereon; and
      an electrical connection portion configured to electrically connect the first and second circuit boards to each other;
   the first circuit board includes a through hole or a cut-out defined therein;
   the housing extends in the vertical direction through the through hole or the cut-out;
   the second circuit board includes:
      a first region axially aligned with the first circuit board;
      a second region axially aligned with the through hole or the cut-out; and
      a third region which does not axially overlap with any of the first circuit board, the through hole, or the cut-out; and
   the support member is fixed to the third region;
   the attachment portion includes:
      a central portion fixed to the housing; and
      a plurality of arm portions, each of which is arranged to extend radially outward from the central portion; and
   each arm portion is fixed to the support member.

2. The motor according to claim 1, further comprising a sensor configured to detect a rotational position of the rotating portion, and mounted on an upper surface of the first circuit board.

3. The motor according to claim 2, wherein the AC to DC conversion portion is mounted on a lower surface of the second circuit board.

4. The motor according to claim 3, wherein the AC to DC conversion portion includes an electrolytic capacitor.

5. The motor according to claim 4, further comprising a transistor array mounted on a lower surface of the second circuit board.

6. The motor according to claim 5, further comprising a control IC mounted on the lower surface of the second circuit board.

7. The motor according to claim 1, wherein
   the first circuit board includes a body portion that is circular or substantially circular in a plan view;
   the second circuit board is circular or substantially circular in a plan view; and
   the body portion has an outside diameter smaller than an outside diameter of the second circuit board.

8. The motor according to claim 7, wherein the support member is fixed to the second circuit board at a position radially outward of the body portion.

9. The motor according to claim 8, wherein the electrical connection portion includes at least one of a connector or a lead wire.

10. The motor according to claim 9, wherein the attachment portion is a plate-shaped member extending perpendicularly or substantially perpendicularly to the central axis.

11. The motor according to claim 1, wherein the second circuit board is fixed to the support member at a circumferential position different from a circumferential position of each arm portion.

12. The motor according to claim 11, wherein each arm portion is fixed to the support member at a position axially overlapping with the third region of the second circuit board.

13. The motor according to claim 12, wherein
each arm portion includes a board contact surface arranged at an axial level higher than that of an upper surface of the central portion; and
a lower surface of the first circuit board is arranged to be in contact with the board contact surface.

14. The motor according to claim 13, wherein
each arm portion includes a board fixing portion including at least a portion of the board contact surface; and
the first circuit board is fixed to the board fixing portion.

15. The motor according to claim 14, wherein the attachment portion is directly fixed to the support member.

16. The motor according to claim 1, wherein
a lower end portion of the housing is arranged axially above an upper surface of the second circuit board; and
neither the first region nor the second region of the second circuit board includes a through hole or a cut-out used to arrange any other member therein.

17. The motor according to claim 16, wherein
the stationary portion further includes:
a stator core arranged radially outside the housing and radially inside the magnet; and
an insulator made of resin and attached to the stator core;
the insulator includes:
an insulating portion located to intervene between the stator core and the coils;
a leg portion arranged to extend axially downward from the insulating portion, with a lower end portion of the leg portion being located axially below the coils; and
a claw portion arranged to project radially outward from the lower end portion of the leg portion; and
a lower surface of the first circuit board is arranged to be in contact with an upper surface of the claw portion.

18. The motor according to claim 17, wherein an upper end portion of the shaft is arranged axially above an upper surface of the top plate portion.

* * * * *